(No Model.)
J. LEWIS.
VEHICLE AXLE.
No. 461,266. Patented Oct. 13, 1891.
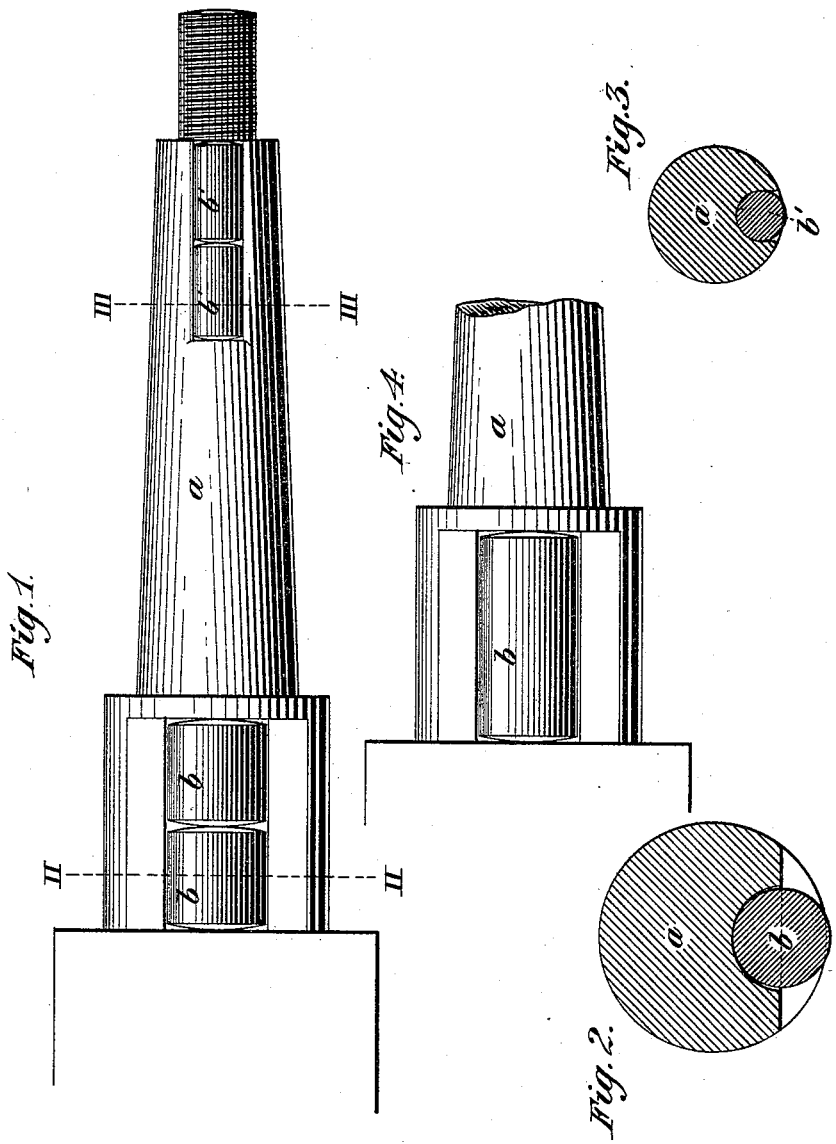
WITNESSES.
INVENTOR.

UNITED STATES PATENT OFFICE.

JAMES LEWIS, OF McKEESPORT, PENNSYLVANIA.

VEHICLE-AXLE.

SPECIFICATION forming part of Letters Patent No. 461,266, dated October 13, 1891.

Application filed March 23, 1891. Serial No. 385,969. (No model.)

*To all whom it may concern:*

Be it known that I, JAMES LEWIS, of McKeesport, in the county of Allegheny and State of Pennsylvania, have invented a new and useful Improvement in Vehicle-Axles, of which the following is a full, clear, and exact description, reference being had to the accompanying drawings, forming part of this specification, in which—

Figure 1 is a plan view of my improved axle-spindle. Fig. 2 is a vertical section on the line II II of Fig. 1. Fig. 3 is a vertical cross-section on the line III III of Fig. 1; and Fig. 4 is a plan view of a part of the axle-spindle, showing a modification of my invention.

The object of my invention is to provide an axle for vehicles of such construction as to afford but little frictional resistance to the rotation of the wheel.

It consists in placing on the under side of the axle spindle or journal one or more anti-friction rollers, which bear on one side in suitable recesses made in the axle-journal and on the under side bear against the hub of the wheel.

In the form of axle-spindle shown in Fig. 1 of the drawings there are two sets of rollers $b\ b'$, the rollers $b$ being set in a partial cylindrical cavity made at the rear of the spindle $a$, and the rollers $b'$ being set in a similar cavity at the front portion of the spindle, both cavities, however, being on the under side of the spindle. The outermost portions of the peripheries of the rollers are about flush with the periphery of the spindle. When the wheel is put on the spindle, the rear or inner portion of the hub has a bearing on the rollers $b$ and the outer portion of the hub has a bearing on the rollers $b'$, and these rollers being on the under side of the spindle the weight of the vehicle is exerted principally on the faces of the rollers. When the wheel rotates, the rollers are turned in their cavities on the spindle, and will thus very largely prevent frictional resistance to the motion of the vehicle.

The form and arrangement of the rollers may be varied in many ways and may be applied to axle-spindles of any shape or size. Instead of having the rollers arranged in two separate sets, as shown in Fig. 1 of the drawings, they may be arranged in a continuous line from one end of the spindle to the other.

In Fig. 4 I show instead of two rollers $b$ a single roller of greater length, and when two adjacent rollers are employed their ends are preferably made convex.

I am aware that anti-friction rollers in themselves are not new, and I do not desire to claim the same, broadly.

I claim—

1. The combination, with an axle-spindle having a grooved lower portion, of rollers having convex adjacent ends lying in the groove, substantially as described.

2. The combination, with an axle-spindle having a groove on its under side, of one or more rollers located in said groove, the upper portions of said rollers bearing on the sides of the groove and the lower portion being substantially flush with the under surface of the axle, substantially as described.

In testimony whereof I have hereunto set my hand this 19th day of March, A. D. 1891.

JAMES LEWIS.

Witnesses:
DAVID S. McCANN,
H. M. CORWIN.